(12) United States Patent
Kusakabe

(10) Patent No.: US 11,003,721 B2
(45) Date of Patent: May 11, 2021

(54) SYSTEM, CONTROL METHOD, AND STORAGE MEDIUM

(71) Applicant: CANON KABUSHIKI KAISHA, Tokyo (JP)

(72) Inventor: Yuki Kusakabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 16/161,839

(22) Filed: Oct. 16, 2018

(65) Prior Publication Data
US 2019/0129953 A1    May 2, 2019

(30) Foreign Application Priority Data

Oct. 31, 2017    (JP) .............................. JP2017-211217

(51) Int. Cl.
| | |
|---|---|
| *G06F 17/00* | (2019.01) |
| *G06F 7/00* | (2006.01) |
| *G06F 16/93* | (2019.01) |
| *H04L 29/08* | (2006.01) |
| *G06F 16/11* | (2019.01) |
| *G06F 16/185* | (2019.01) |

(52) U.S. Cl.
CPC ............ *G06F 16/93* (2019.01); *G06F 16/122* (2019.01); *G06F 16/185* (2019.01); *H04L 67/06* (2013.01)

(58) Field of Classification Search
CPC ...... G06F 16/93; G06F 16/122; G06F 16/185; H04L 67/06

USPC ......................................................... 707/736
See application file for complete search history.

(56) References Cited

U.S. PATENT DOCUMENTS

| | | | | | |
|---|---|---|---|---|---|
| 5,742,818 | A * | 4/1998 | Shoroff | ............... | G06F 16/1794 707/999.2 |
| 8,635,198 | B1 * | 1/2014 | McBrian | ............... | G06F 16/958 707/695 |
| 8,738,414 | B1 * | 5/2014 | Nagar | ................... | G06Q 10/101 705/7.25 |
| 2003/0142953 | A1 * | 7/2003 | Terada | ................. | G11B 27/329 386/241 |
| 2004/0117411 | A1 * | 6/2004 | Ueda | ....................... | G06F 16/10 707/999.2 |
| 2006/0067171 | A1 * | 3/2006 | Elmers, II | ............ | G11B 27/105 369/30.3 |
| 2006/0095463 | A1 * | 5/2006 | Tsukamoto | ............. | G06F 16/71 707/999.102 |
| 2007/0011665 | A1 * | 1/2007 | Gandhi | .................... | H04L 67/26 717/136 |
| 2008/0052301 | A1 * | 2/2008 | Miyata | .................... | G06F 16/58 707/999.001 |
| 2008/0288868 | A1 * | 11/2008 | Lakey | .................... | G06F 3/0483 715/716 |
| 2009/0177301 | A1 * | 7/2009 | Hayes | .................. | G11B 19/025 700/94 |

(Continued)

FOREIGN PATENT DOCUMENTS

JP        2007-128365 A        5/2007

*Primary Examiner* — Pavan Mamillapalli
(74) *Attorney, Agent, or Firm* — Canon U.S.A., Inc. IP Division

(57) ABSTRACT

In a case where a designation of a first index and a second index is received, two folders having a hierarchical structure corresponding to the first index and second index are generated in response to a request to generate.

6 Claims, 14 Drawing Sheets

(56) References Cited

U.S. PATENT DOCUMENTS

2012/0110515 A1\* 5/2012 Abramoff ............. G06F 16/904
 715/854
2016/0026815 A1\* 1/2016 Staley ................. G06F 16/3337
 707/785

\* cited by examiner

FIG. 5

| DOCUMENT ID | PREFECTURE | DISTRICT/CITY | TOWN | SCHOOL |
|---|---|---|---|---|
| 1001 | TOKYO | SETAGAYA | KITAZAWA | 123 SCHOOL |
| 1002 | KANAGAWA | ATSUGI | AIKO | ABC GAKUEN |
| 1003 | KANAGAWA | HIRATSUKA | KITAKANAME | 456 GAKUIN |
| 1004 | TOKYO | OTA | IKEGAMI HONCHO | 789 EN |
| 1005 | TOKYO | SETAGAYA | KITAZAWA | SHOUCHIKUBAI TUTORING SCHOOL |
| 1006 | KANAGAWA | ATSUGI | NUKUMIZU | XY SCHOOL |
| 1007 | TOKYO | OTA | OOMORI | N-LAB |
| 1008 | TOKYO | SETAGAYA | TAMAGAWA | AIU SEMINAR |

SYSTEM, CONTROL METHOD, AND STORAGE MEDIUM

BACKGROUND

Field

The present disclosure relates to a system on which an application runs for exporting a file from a server configured to manage the file by using an index and a server configured to manage the file by using a folder, a control method therefor, and a storage medium.

Description of the Related Art

In a server (document management system) configured to manage a file of an electronic document, for example, by using a folder in the past generally classifies files into folders in a hierarchical structure. In a server configured to manage a file by using an index, an index (including a key and a value) set uniquely by a user or a system administrator is added to a file for classification in general.

Typically, in order to obtain a target document in a document management system configured to manage a file by using an index, a key and a value are designated as conditions to search the file matching the conditions.

In such a document management system that manages a file by using an index, a scheme is available not only for searching and retrieving a file but also for providing similar operability to that of a document management system which manages a file by using a folder. Japanese Patent Laid-Open No. 2007-128365 discloses preset of a hierarchy of indices and use of preset hierarchical indices for the purpose of increases of the speed of an index search.

SUMMARY OF THE INVENTION

According to an aspect of the present disclosure, a system where an application runs on the system and can export a file from a first server managing a file by using an index to a second server managing a file by using a folder includes a first obtaining unit configured to obtain from the first server a plurality of indices used for managing files in the first server, a presenting unit configured to present the obtained plurality of indices, a receiving unit configured to receive designation of one or more indices from the presented plurality of indices, a generator configured to generate a request to generate a folder corresponding to the designate index to be used for storing an export target file in the second server, and a second obtaining unit configured to obtain the export target file from the first server. In a case where the receiving unit receives a designation of a first index and a second index different from the first index, two folders having a hierarchical structure corresponding to the first index and the second index are generated in response to the request to generate.

Further features will become apparent from the following description of exemplary embodiments with reference to the attached drawings.

BRIEF DESCRIPTION OF THE DRAWINGS

FIG. 5 illustrates an example of a data structure stored as index information.

DESCRIPTION OF THE EMBODIMENTS

If a real file is exported from a first server that manages a file by using an index to a second server that manages a file by using a folder, the corresponding index used for management in the first server is not imported to the second server. Therefore, it is difficult to identify the file exported to the second server. Japanese Patent Laid-Open No. 2007-128365 as described above does not consider such an export of a file to a server which manages files by using folders.

Accordingly, when a file is exported from a server that manages a file by using an index to a server that manages a file by using a folder, the present disclosure can reflect an index corresponding to the export target file to an export destination folder.

According to an aspect of the present disclosure, when a file is exported from a server that manages files with indices to a server that manages files in folders, the present disclosure can reflect an index corresponding to the export target file to an export destination folder.

Embodiment 1

Figure 1:
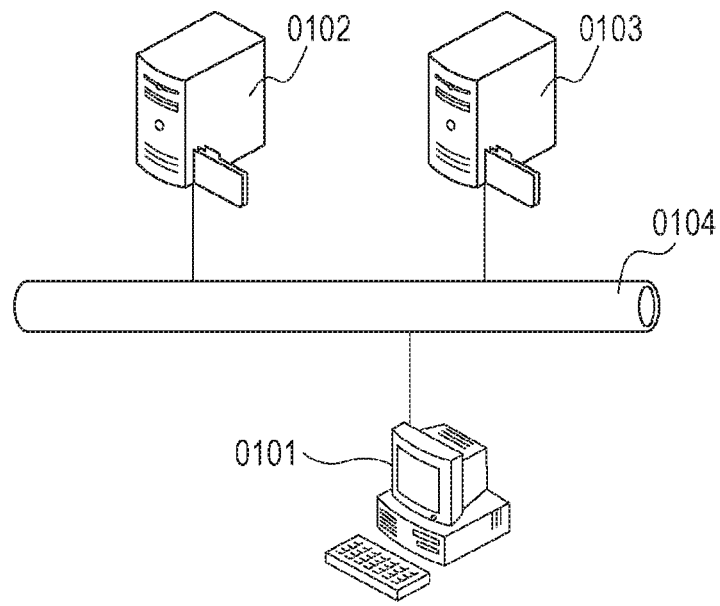
FIG. 1 illustrates an overall configuration of an embodiment.

FIG. 1 illustrates an overall configuration according to an embodiment of the present disclosure. Referring to FIG. 1, an information processing apparatus 0101 is connected with document management servers 0102 and 0103 via a command communicable network 0104. The information processing apparatus 0101 can be, for example, a desktop personal computer (PC), a laptop PC, a mobile PC, a tablet PC, or a smart phone internally containing a program executable environment. The information processing apparatus 0101 internally contains an environment in which a program, such as a document management application, is executable, which will be described with reference to FIG. 3 below. A document management server 0102 is a server that manages a file, such as a document, by using an index. An application program document management server 0103 is a server that manages a file, such as a document, by using a folder. The document management server 0103 can be incorporated into the information processing apparatus 0101.

Figure 2:
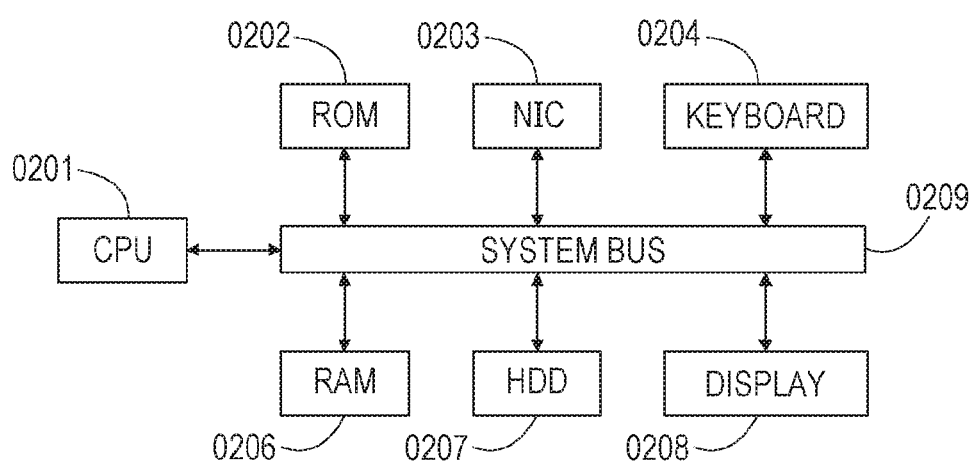
FIG. 2 is a block diagram illustrating a hardware configuration of an information processing apparatus.

FIG. 2 is a block diagram illustrating a hardware configuration of the information processing apparatus 0101 and the document management servers 0102 and 0103 illustrated in FIG. 1. The document management servers 0102 and 0103 are external apparatuses that are communicable with the information processing apparatus 0101 and can be PCs.

A CPU 0201 is a central processing unit configured to control operations to be performed by the information processing apparatus. The CPU 0201 can execute an application program, an operating system (OS) and a document management application stored in an HDD 0207 to control to temporarily store information and files for execution of programs in a RAM 0206. A ROM 0202 is a read-only memory for storing data and can internally store a program, such as a basic I/O program, font data usable for file processing, template data and other various data. An NIC 0203 is a network interface, and the information processing apparatus 0101 can exchange data with external apparatuses through the NIC 0203.

A keyboard 0204 is an input device for receiving an instruction input from a user and is configured to be used for inputting a control command and for inputting text from a user to a document management application. A RAM 0206 is a temporary memory and is an access memory functioning as a main memory or a work area to be used by the CPU 0201. The HDD 0207 is one of external memories and is a hard disk (HD) functioning as a large volume memory configured to store a document file, an application program, an OS, and a related program. A display unit 0208 is an output device and can be configured to, for example, display a command input from the keyboard 0204 or a state of the document management application according to the present embodiment. A system bus 0209 is a bus configured to connect components within the information processing apparatus 0101, the document management servers 0102 and 0103, and is responsible for flow of data within the information processing apparatus 0101 and the document management servers 0102 and 0103.

The document management servers 0102 and 0103 do not need to include the keyboard 0204 and the display unit 0208.

Figure 3:
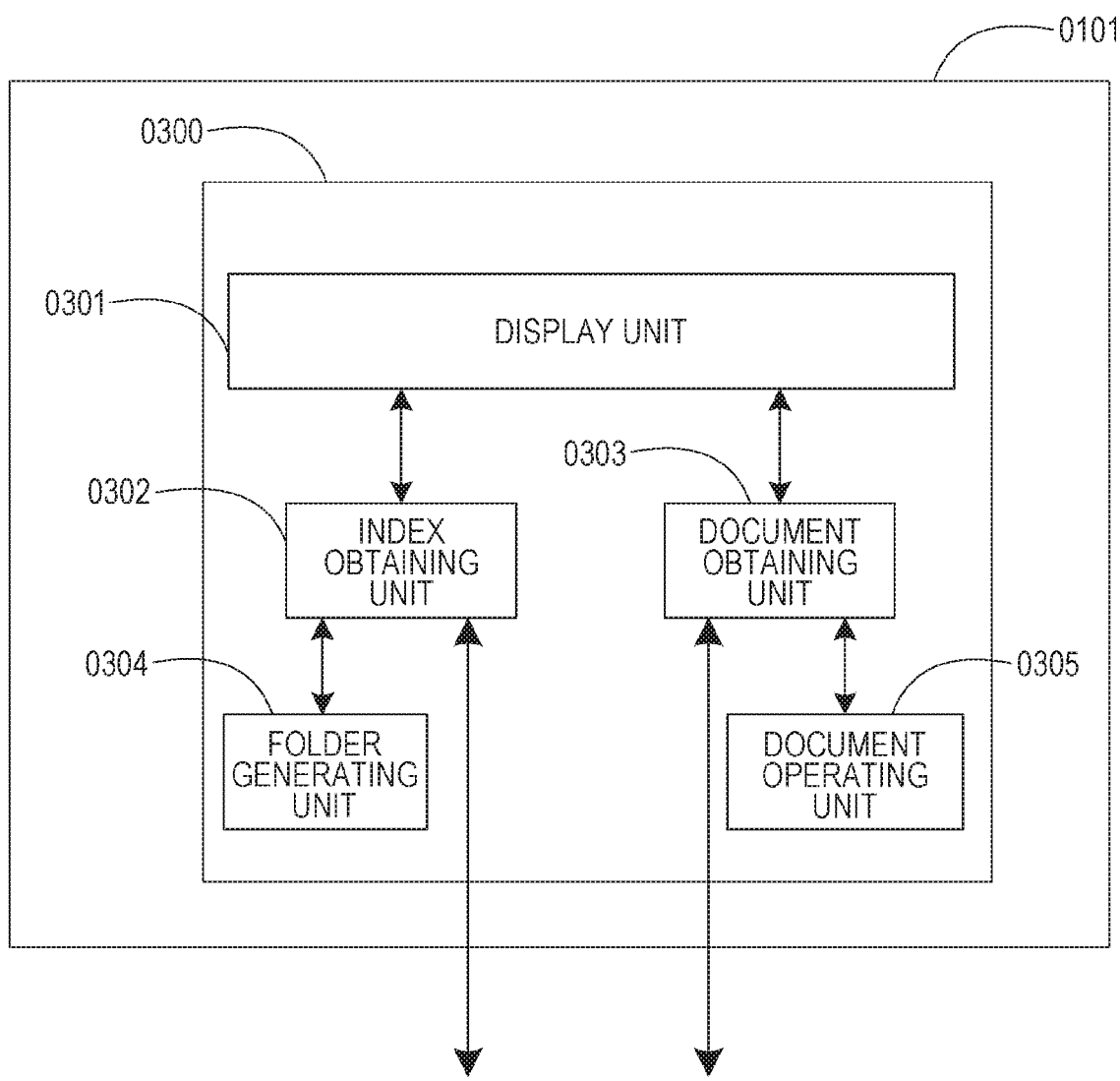
FIG. 3 is an example of a software configuration diagram of a document management application.

FIG. 3 is a software configuration diagram illustrating functionality of a document management application 0300. The document management application 0300 is an application configured to export a file from the document management server 0102 configured to manage a file by using an index to the document management server 0103 configured to manage a file by using a folder. The document management application 0300 is a program module loaded into the RAM 0206 and executed by the CPU 0201 for operating for implementing within the information processing apparatus 0101.

The document management application 0300 can use an index obtaining unit 0302 to obtain a plurality of indices under management of the document management server 0102 and to display them on a display unit 0301. A document obtaining unit 0303 enables obtaining a document stored in the document management server 0102. The obtained document can be displayed along with an index on the display unit 0301 and can be stored in another document management server 0103 by following the processing performed by the document operation unit 0305. A folder generating unit 0304 is configured to perform a request to generate a folder for storing a document to the document management server 0103. In response to a generation request, a folder is generated in the document management server 0103. The folder generating unit 0304 can also request to store a file in a designated folder to the document management server 0103. In response to a storage request, a file can be stored in a designated folder in the document management server 0103.

Figure 4:
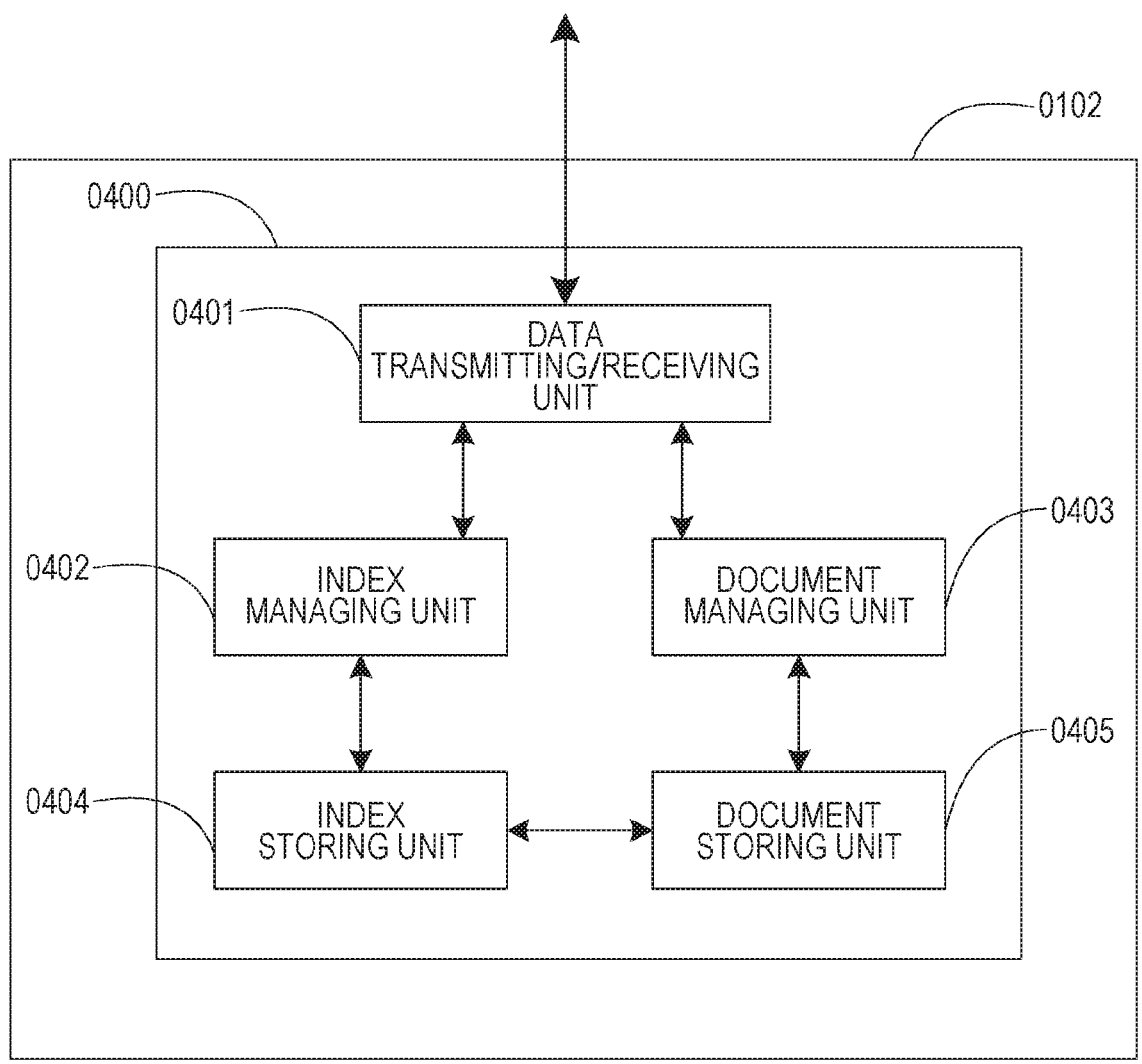
FIG. 4 is an example of a software configuration diagram of a document management server which manages by using an index.

FIG. 4 is a software configuration diagram illustrating functionality of the document management server 0102 configured to manage a document by using an index. A server application 0400 includes a data transmitting/receiving unit 0401, an index managing unit 0402, a document managing unit 0403, an index storage unit 0404, and a document storage unit 0405.

The index managing unit 0402 is configured to transmit an index stored in the index storage unit 0404 to the document management application 0300 via the data transmitting/receiving unit 0401 in response to a request from the management application 0300. When the data transmitting/receiving unit 0401 receives a request to obtain a document from the document management application 0300, the document managing unit 0403 transmits the document stored in the document storage unit 0405 to the document management application 0300 via the data transmitting/receiving unit 0401.

FIG. 5 illustrates examples of an index to be managed within the document management server 0102. An index 0501 includes a key 0502 and a value 0503. The key 0502 is an item used as a headline of the index 0501. The value 0503 is a value stored in the key of the index 0501. Referring to FIG. 5, for example, a key "DOCUMENT ID" can store values "1001" and "1002" and a key "PREFECTURE" can store values "TOKYO" and "KANAGAWA". Referring to FIG. 5, for example, a certain document is added indices, DOCUMENT ID:1001, PREFECTURE: TOKYO, DISTRICT/CITY: SETAGAYA, TOWN: KITAZAWA, and SCHOOL: 123 SCHOOL.

Figure 6:
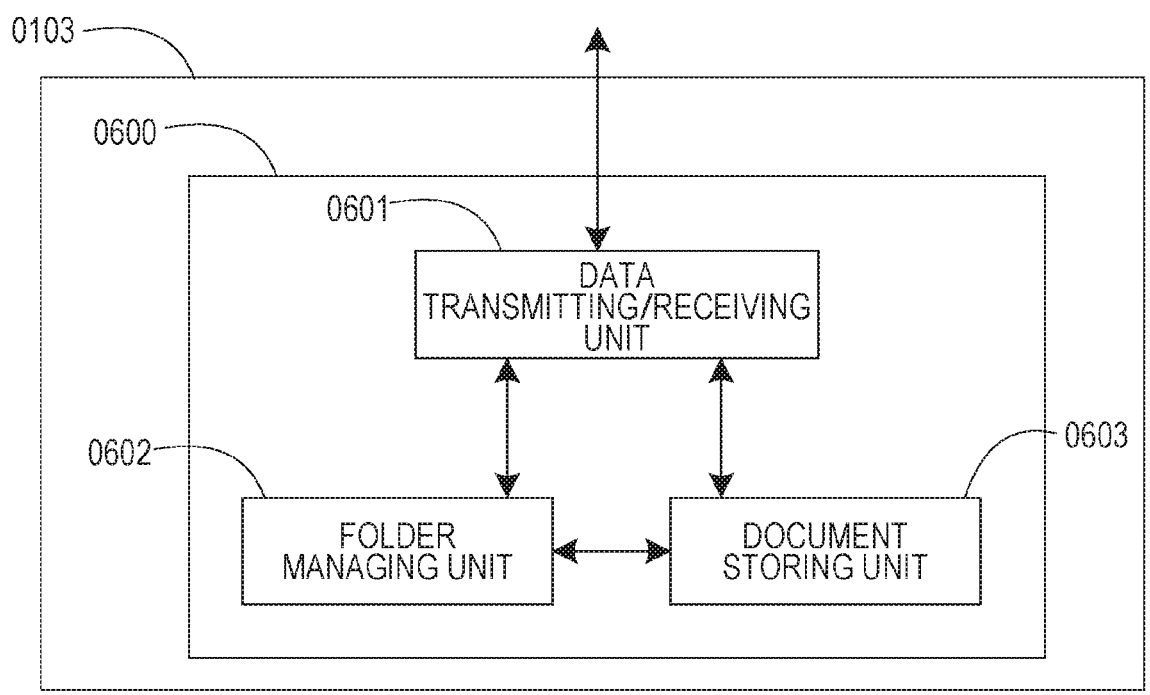
FIG. 6 illustrates an example of a software configuration diagram of a document management server which manages by using a folder.
Figure 7:
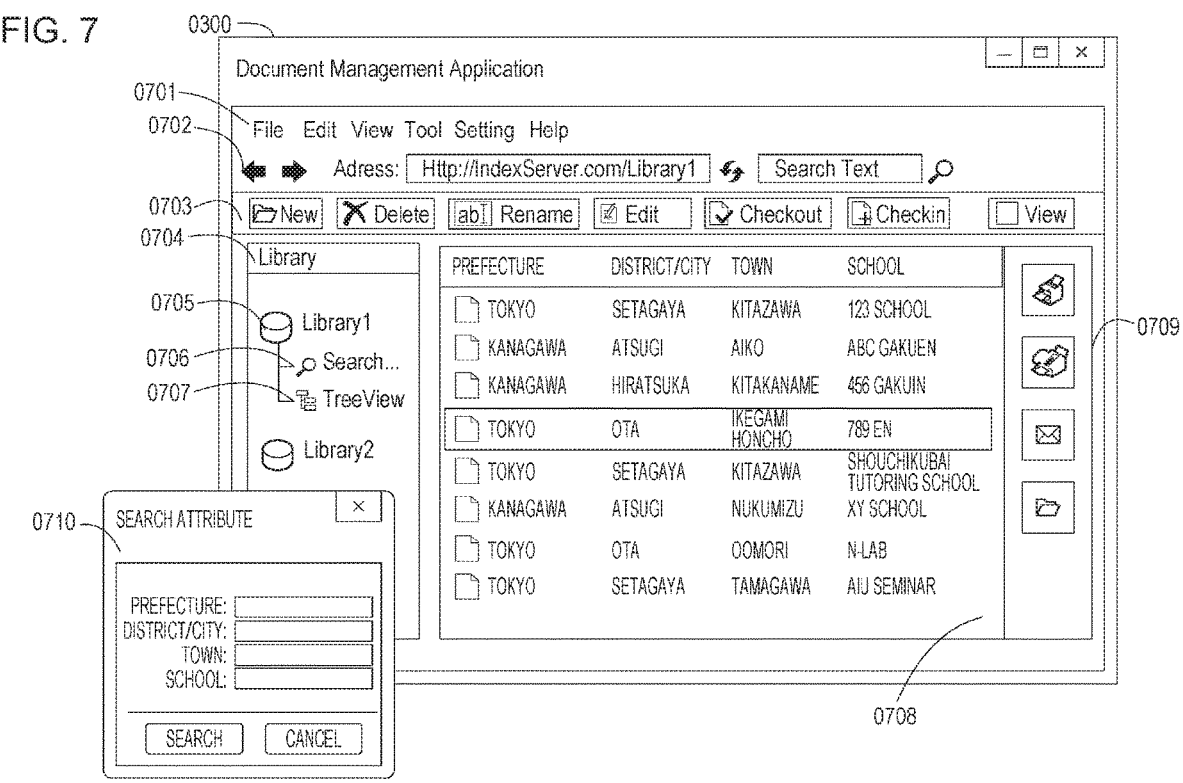
FIG. 7 illustrates an example of a user interface in a document management application.

FIG. 6 is a software configuration diagram illustrating functionality of the document management server 0103 configured to manage a document by using a folder. A server application 0600 includes a data transmitting/receiving unit 0601, a folder managing unit 0602, and a document storage unit 0603. The folder managing unit 0602 can generate a folder for storing a document in response to a request from the document management application 0300. When a request to store a document is received from the document management application 0300, the document storage unit 0603 stores a document in a designated folder via the data transmitting/receiving unit 0601. FIG. 7 illustrates an example of a user interface provided by the document management application 0300. A menu 0701 is a menu bar configured to list display executable commands for a folder or a file. An address bar 702 is configured to display a path to a folder that is currently referred to. A tool bar 0703 displays a shortcut button corresponding to an executable command selected from the menu 0701. The executable command enables receipt of a designation of an operation for a file from a user. A navigation pane 0704 is configured to display a list of various document management servers registered as a library. For example, the document management servers 0102 and 0103 can be registered as a library. A document management server 0102 that manages a document by using an index is registered with a library 0705.

An attribute search tree 0706 can be used to perform an attribute search for a document managed by the document management server 0102. In order to perform an attribute search, the attribute search tree 0706 can be selected so that an attribute search dialog 0710 can be displayed to receive a designation of a condition for the search. Through an attribute search dialog 0710, a key word of an index stored in the selected library 0705 can be designated to search a document and to display a file list view 0708.

A search tree view 0707 can hierarchically display keys designated to the document management server 0102. A display method thereof will be described with reference to FIGS. 9A to 9C. The file list view 0708 can display a list of documents each having a designated index and key. A button registered with the output bar 0709 can be pressed to enable an action associated with the button can be executed on the document selected on the file list view 0708. The output bar 0709 has buttons for printing facsimile transmission, e-mail transmission, etc.

Next, with reference to a user interface example of the document management application illustrated in the flowchart in FIG. 8 and the FIGS. 9A to 9C, a flow of processing to be performed by the document management application 0300 running on the information processing apparatus 0101 will be described. In the document management application 0300, an index provided to a document managed in the document management server 0102 is designated to search the document for exporting it to the document management server 0103. These steps of the flowchart according to the present embodiment are implemented by a program relating to the flowchart, read out to the RAM 0206, and executed by the CPU 0201.

Figure 9A:
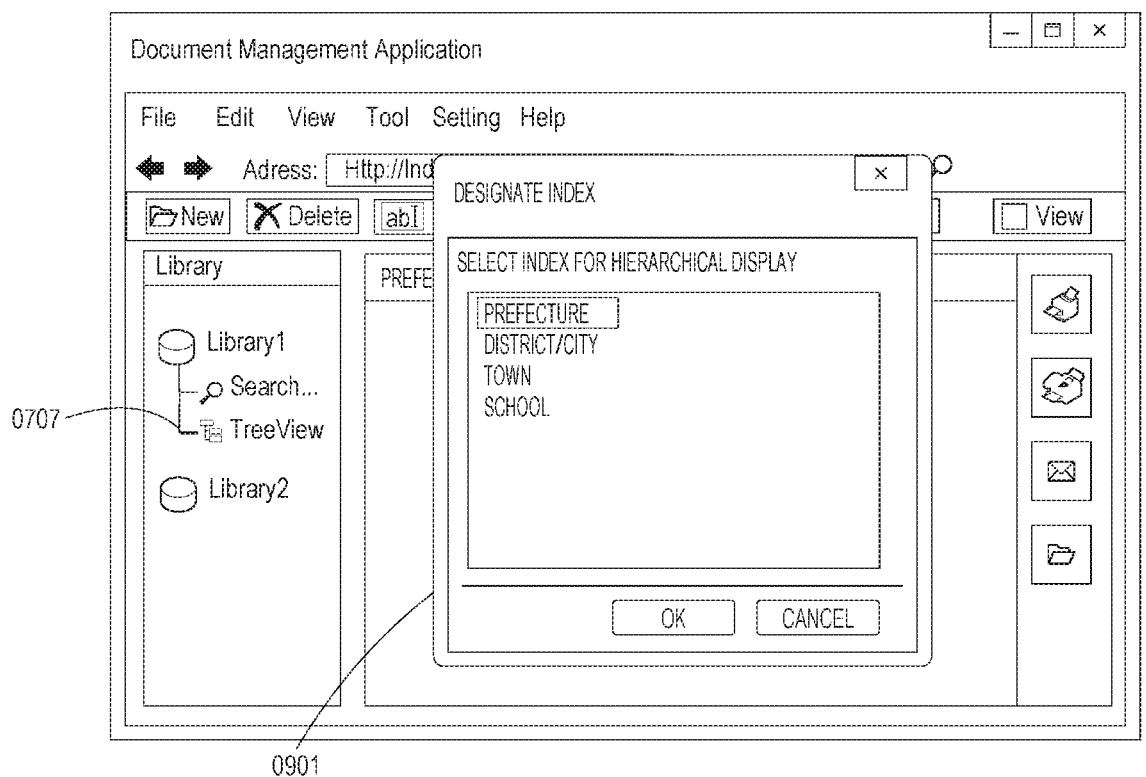
FIGS. 9A to 9C are examples of user interfaces presenting display forms of a search tree.
Figure 9B:
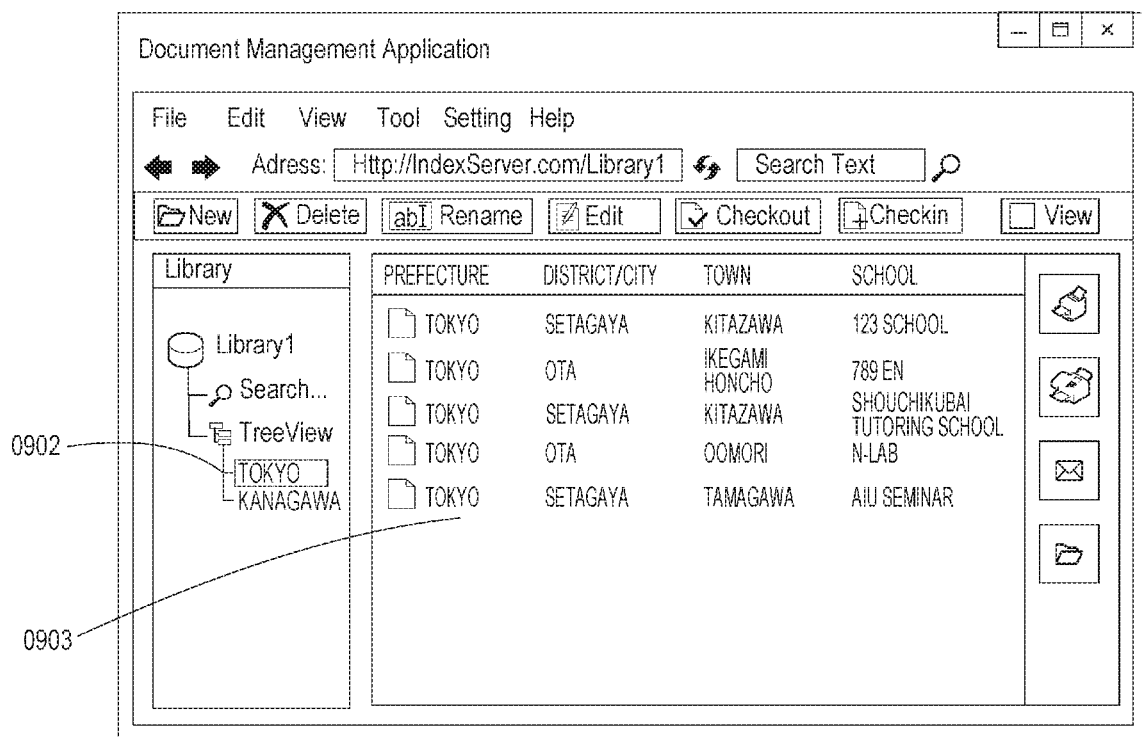
Figure 9C:
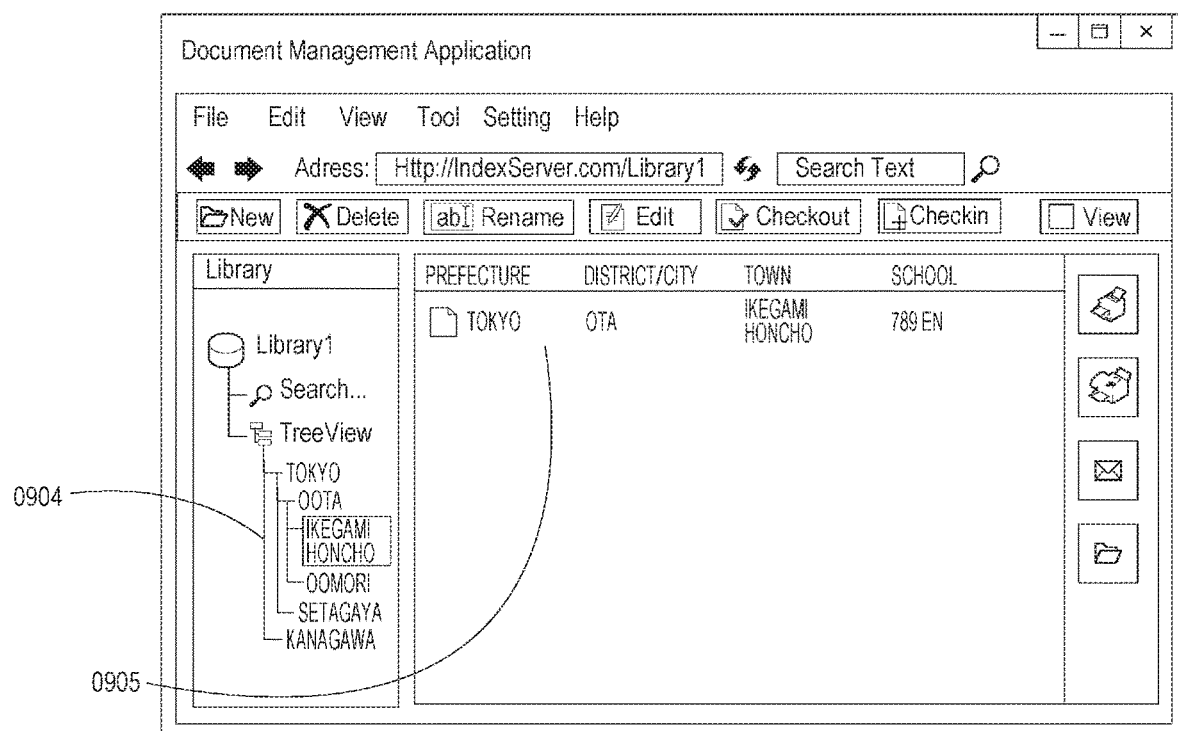

The document management application 0300 displays an index designation dialog 0901 as illustrated in FIGS. 9A to 9C on the display unit 0301 when the search tree view 0707 is designated. In S0801, the index obtaining unit 0302 receives one or more designations for keys of hierarchically displayed indices through the index designation dialog 0901. For example, assume that a key "PREFECTURE" selected through the index designation dialog 0901 is designated as a key in index information 0501 registered with the library 0705. Next, in S0802, the index obtaining unit 0302 obtains a list of values registered with the key of the index designated in the index designation dialog 0901 from the document management server 0102 and presents a list of obtained values as an item 0902. Next in S0803, a determination is made whether the index obtaining unit 0302 has checked all of values on the list. If not, a value designated as a key is checked. In S0804, the index obtaining unit 0302 checks whether the value designated as a key has been displayed. If so, the index obtaining unit 0302 in S0805 enumerates the values in a tree view as a search tree view. If already displayed, the index obtaining unit 0302 in S0806 obtains the next value. All of the values are checked so that values registered with the key designated on the display unit 0301 can be enumerated as a list under the search tree view.

Because the item 0902 has two of "TOKYO" and "KANAGAWA" as types of values registered with the key "PREFECTURE", two tries are enumerated under the search tree view for presentation. In this case, if one of trees (values) enumerated is designated in a view 0903, a document list including the designated value is displayed as the file list view 0708.

Figure 8:
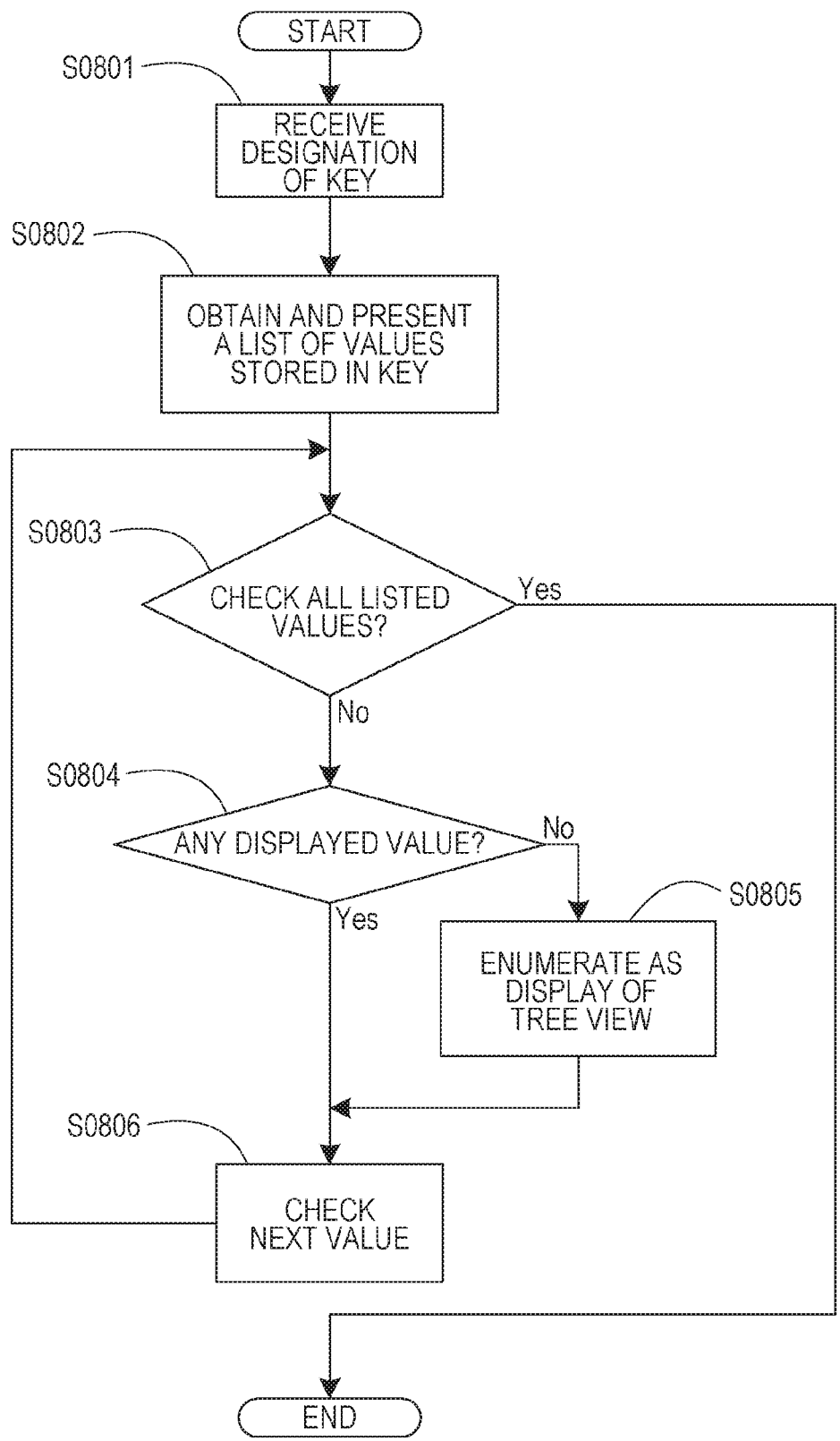
FIG. 8 is a flowchart illustrating processing for generating a search tree to be displayed.

The items 0902 enumerated under the search tree view 0707 are selected, and an index to be hierarchically displayed is designated by using the index designation dialog 0901 based on the processing of the flowchart illustrated in FIG. 8. Thus, the values can be hierarchically displayed as indicated by a reference 0904. In this case, for a hierarchy display, values of a lower layer are displayed as a result if a narrowing search of a list refined with values of an upper layer. Reference 0905 indicates a display of a document as a result of a narrowing search to "PREFECTURE: TOKYO", "DISTRICT/CITY: OTA", "TOWN: IKEGAMI-HONCHO" by repeating three times the processing (FIG. 8) for designating keys and values of an index and displaying a tree view.

Next, with reference to FIGS. 10A and 10B, processing for exporting a document stored in the document management server 0102 to the document management server 0103 will be described. This export is based on a hierarchical structure represented by the tree view on the document management application 0300 illustrated in FIG. 8 and FIGS. 9A to 9C.

Figure 10A:
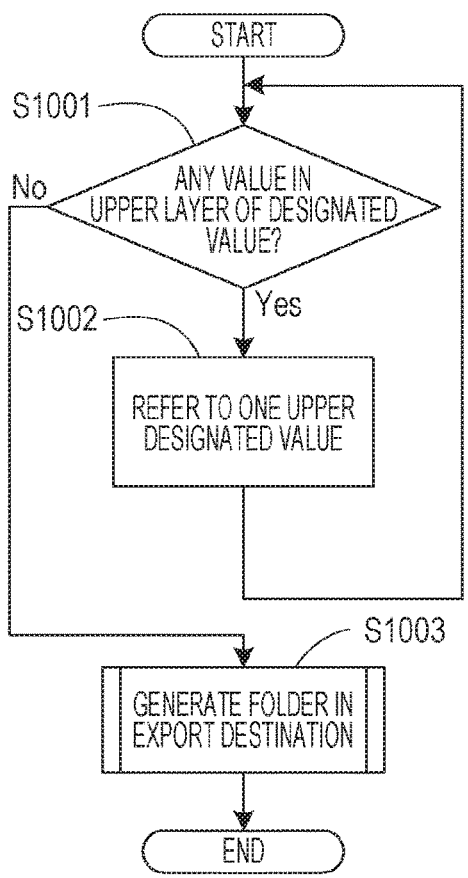
FIGS. 10A and 10B are flowcharts illustrating processing for exporting to a document management server which manages by using a folder.

Processing in the flowchart illustrated in FIG. 10A is started in response to an instruction to generate a folder for a value selected on the search tree view 0904 by a user via the user interface on the display unit 0301, which is received by the document management application 0300. In S1001, the folder generating unit 0304 checks whether any value exists in the upper layer of the designated key. If a value exists, the folder generating unit 0304 in S1002 refers to a value designated in one upper hierarchical layer on the display unit 0301. Next, the processing returns to S1001 where the folder generating unit 0304 checks whether any value exists in the upper layer of the referred value. If not, the folder generating unit 0304 in S1003 executes the processing for generating a folder for storing an export target file in the document management server 0103 that is an export destination in this case.

Figure 10B:
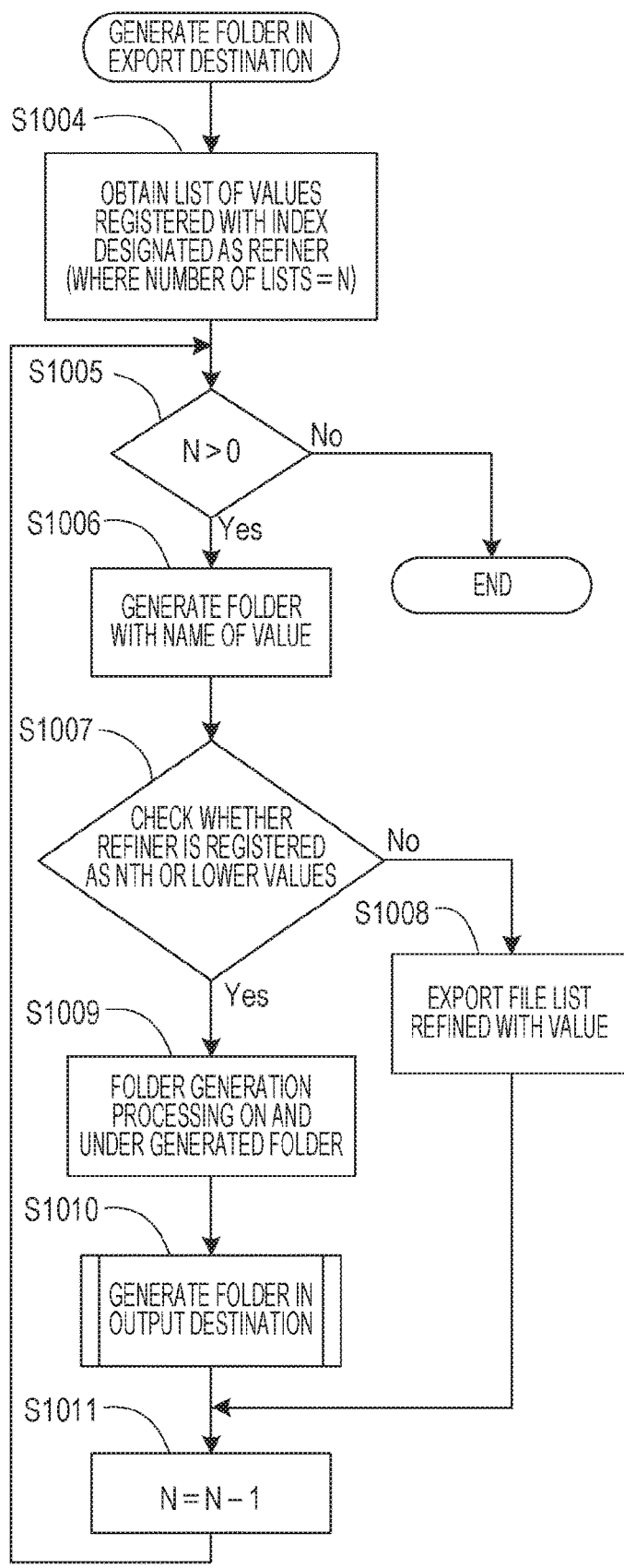

FIG. 10B is a flowchart illustrating the processing (S1003) for generating a folder in an export destination. In S1004, the folder generating unit 0304 obtains a list of values corresponding to an index designated as a refiner on the display unit 0301. For example, in a case where "PREFECTURE: TOKYO" is designated as a refiner, the value "TOKYO" is obtained. If "PREFECTURE: TOKYO, KANAGAWA" are designated as refiners, a value "TOKYO" and a value "KANAGAWA" are obtained. In S1005, the folder generating unit 0304 checks whether there is at least one list. If so, in S1006, the folder generating unit 0304 requests the document management server 0103 to generate a folder by using the name indicated by the value. If the value "TOKYO" is obtained in S1004, for example, a folder named as "TOKYO" is generated in S1006. If the value "TOKYO" and the value "KANAGAWA" are obtained in S1004, a folder named as "TOKYO" and a folder named as "KANAGAWA" are generated. Folders with identical names are not generated repetitively.

Next, in S1007, the folder generating unit 0304 checks whether a refiner less than or equal to the generated value exists. If such a refiner exists, the folder generating unit 0304 in S1009 requests the document management server 0103 to generate a folder in an export destination in or under the folder generated in S1006 (S1010). For example, in a case where "PREFECTURE: TOKYO" is designated and then "DISTRICT/CITY: OTA" is designated, a folder named as "OTA" is, in S1010, generated under the folder "TOKYO" generated in S1006. If a narrowing search condition is not registered, the folder generating unit 0304 in S1008 requests to store in the generated folder a document searched as a result of the narrowing search with the value indicating the generated folder name and with a designated value in the layer upper than it. In an example illustrated in FIG. 11B, a document provided with indices "PREFECTURE: TOKYO", "DISTRICT/CITY: OTA", and "TOWN: IKEGAMIHONCHO" are stored in a folder "IKEGAMIHONCHO" under "OTA". The folder "OTA" is under the folder "TOKYO". Because the same processing is performed on the next list of a number of obtained (Nth) values, the folder generating unit 0304 in S1011 checks the next value in the list.

The processing illustrated in the flowchart in FIG. 10B is repeated such that a corresponding hierarchical structure can be generated to generate folders. Thus, when a document is exported from the document management server 0102 to the document management server 0103, an index managed in the document management server 0102 can be reflected to a hierarchical structure of folders in the document management server 0103 and names of the folders.

Figure 11A:
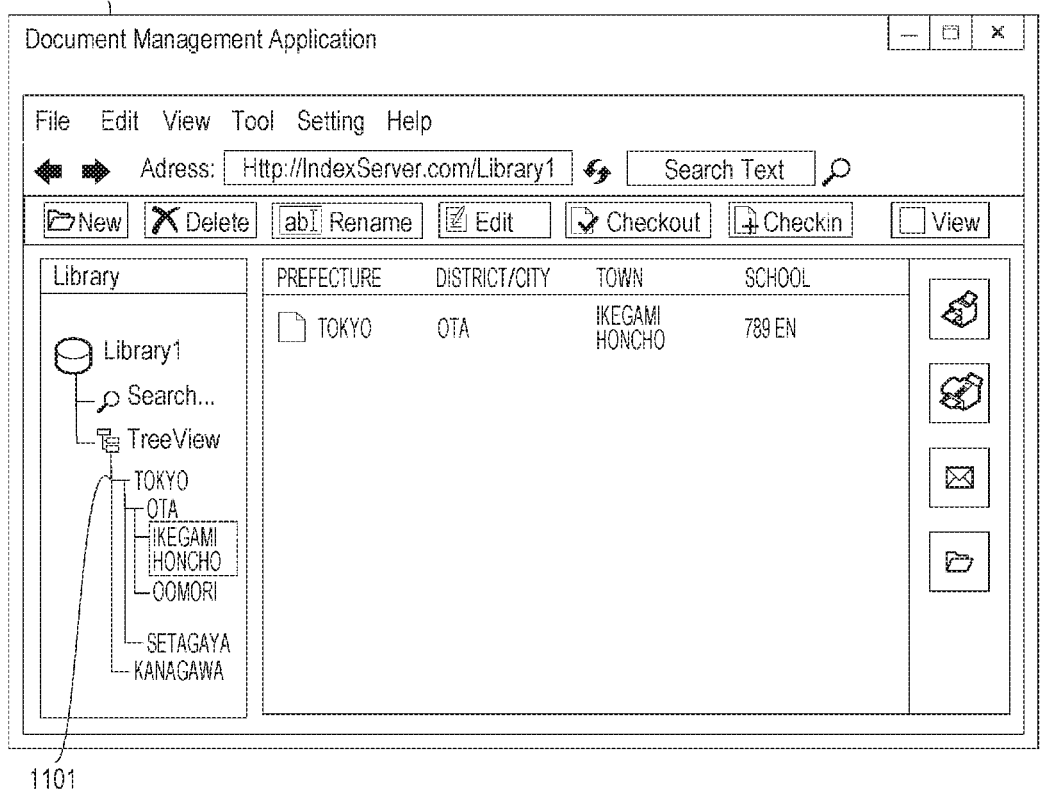
FIGS. 11A and 11B are examples of user interfaces presenting results of an export to the document management server which manages by using a folder.
Figure 11B:
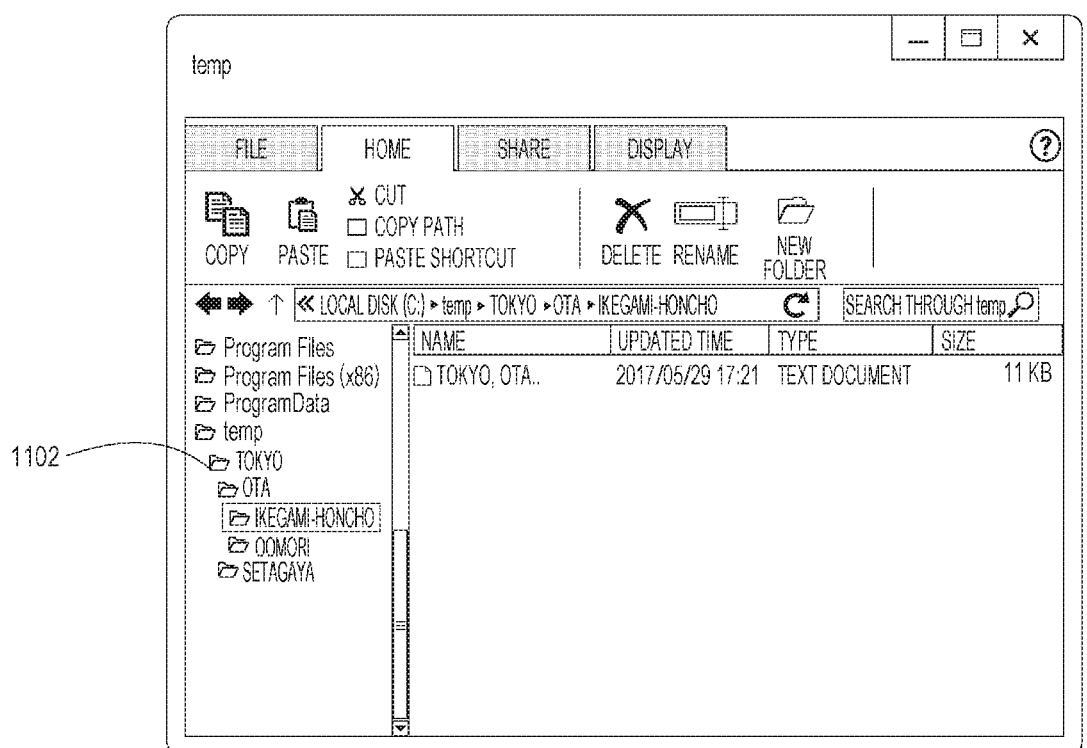

FIG. 11A and FIG. 11B illustrate examples of user interfaces illustrating results of an export of a document from the document management server 0102 to the document management server 0103. When "TOKYO" in a search tree view 1101 in the document management application 0300 is selected (FIG. 11A) and is exported to the document management server 0103, it is classified as in a folder tree 1102 in the document management server 0103 (FIG. 11B). Referring to FIG. 11A and FIG. 11B, a document is exported to the document management server 0103 by keeping a state that the document is classified in the document management application 0300.

According to the present embodiment, a document is exported to a document management server that manages, by using folders based on a tree view, displaying documents in a hierarchical structure in a document management server that manages by using indices. According to the present embodiment, a value of an index for exporting a document to a document management server that manages by using a folder is generated and classified as a folder so that the document can be exported without dropping out the index used for identification by a user.

Embodiment 2

In a case where a folder with a name identical to a value is to be generated in S1006 according to the above-described embodiment, a document could have been previously exported to the location where the folder is to be generated, which, as a result, can be different from the current search tree view subject to the export. In this case, it could be detected that the state of the search tree view before an export is different from a folder configuration in the export destination, and a search tree view following the folder configuration in the export destination can be re-generated for executing an export thereof. A method for preventing improper classification in an export destination will be described with reference to FIG. 12. The same reference numbers for elements form the above-described embodiment that are applicable to the present embodiment will be repeated, and as such, descriptions thereof will be omitted.

Figure 12:
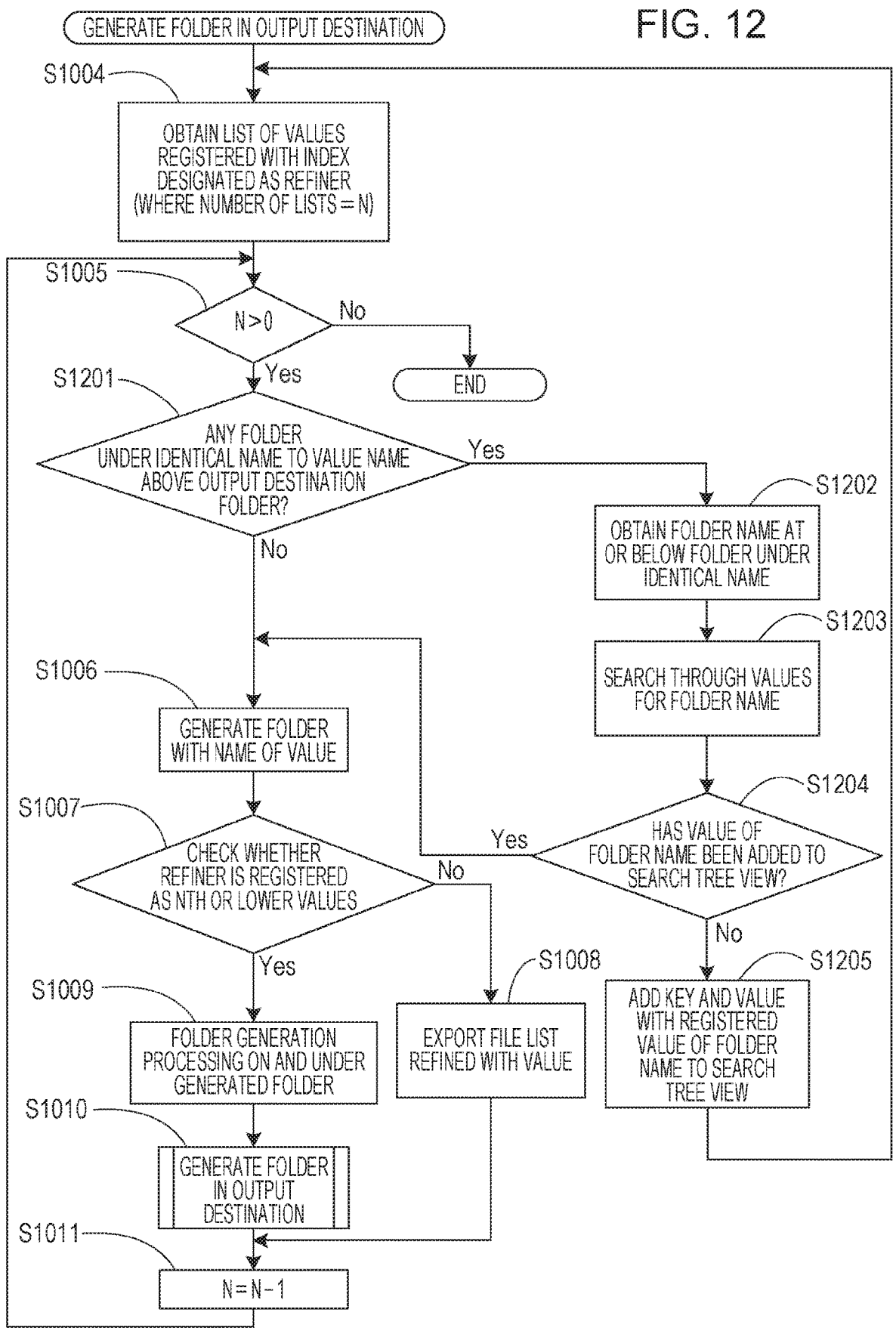
FIG. 12 is a flowchart illustrating processing for re-establishing the same configuration as that of the export destination.

FIG. 12 is a flowchart illustrating processing for re-establishing a configuration identical to that of an export destination. In S1004, the folder generating unit 0304 obtains a list of values registered with indices designated as a refiner. In S1005, the folder generating unit 0304 checks whether there is one or more lists. If so, the folder generating unit 0304 in S1201 checks whether there is a folder with an identical name to a value name in an upper level folder of a folder in the export destination. If so, the folder generating unit 0304 in S1202 obtains a folder name under the folder with the identical name. Next in S1203, the index obtaining unit 0302 searches a key with which the value of the folder name is registered. In S1204, the index obtaining unit 0302 determines whether the value registered with the searched key has previously been added to the search tree view. If not, the processing moves to S1205 where the index obtaining unit 0302 adds the key and value with which the value of the folder name are registered to the search tree view. If they have been added, the processing moves to S1006 where the folder generating unit 0304 requests the document management server 0103 to generate a folder with a name identical to the value.

According to the present embodiment, the folder generation processing is re-executed on the re-generated search tree view. In other words, in a case where, at a certain location to which an export has previously been performed, the state of the search tree view and the folder configuration of the export destination are different, a search tree view is re-established, and a configuration identical to the folder configuration in the export destination is established. This can prevent improper classification in the export destination.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2017-211217 filed Oct. 31, 2017, which is hereby incorporated by reference herein in its entirety.

What is claimed is:
1. An information processing apparatus that exports a file from a first server and stores the exported file in a second server, wherein the first server manages files by using indices, and wherein the second server manages files by using a folder, the information processing apparatus comprising:
    at least a processor and at least a memory coupled to the at least the processor and having stored thereon instructions, and when executed by the at least the processor, cooperating to act as:
a first obtaining unit configured to obtain from the first server the plurality of indices used for managing files in the first server, wherein the obtained plurality of indices includes a plurality of values corresponding to keys designated by a user;
a presenting unit configured to present the plurality of values included in the obtained plurality of indices;
a receiving unit configured to receive a user operation for searching for an export target file based on the plurality of values presented by the presenting unit, wherein the user operation is an operation for designating a first value corresponding to a first key and a second value corresponding to a second key as conditions for searching for the export target file;
a generator configured to generate a first folder corresponding to the first value in the second server and generate a second folder corresponding to the second value under the first folder; and
a second obtaining unit configured to obtain at least a part of the export target file that is searched for based on the user operation from the first server
to store the obtained file in the second folder generated by the generator.

2. The information processing apparatus according to claim 1, further comprising a storing unit configured to request to store the export target file in the second server, wherein files provided with the first value and the second value are stored in the second folder in response to the request to store.

3. The information processing apparatus according to claim 1,
wherein, in a case where the first and second folders having a hierarchical structure corresponding to the first value and the second value have already been generated in the second server, the generator does not request to generate the two folders having the hierarchical structure corresponding to the first value and the second value, and
wherein files provided with the first value and the second value are stored in the already generated second folder.

4. The information processing apparatus according to claim 1,
wherein the presenting unit hierarchically presents the plurality of values, and
wherein the first and second folders are generated based on the plurality of values hierarchically presented.

5. A control method for an information processing apparatus that exports a file from a first server and stores the exported file in a second server, wherein the first server manages files by using indices, and wherein the second server manages files by using a folder, the method comprising:
obtaining from the first server the plurality of indices used for managing files in the first server, wherein the obtained plurality of indices includes a plurality of values corresponding to keys designated by a user;
presenting the plurality of values included in the obtained plurality of indices;
receiving a user operation for searching for an export target file based on the plurality of values presented by the presenting unit, wherein the user operation is an operation for designating a first value corresponding to a first key and a second value corresponding to a second key as conditions for searching for the export target file;
generating a first folder corresponding to the first value in the second server and generate a second folder corresponding to the second value under the first folder; and
obtaining at least a part of the export target file that is searched for based on the user operation from the first server
to store the obtained file in the generated second folder.

6. A non-transitory storage medium storing instructions that when executed cause a computer to execute a method for an information processing apparatus that exports a file from a first server and stores the exported file in a second server, wherein the first server manages files by using indices, and wherein the second server manages files by using a folder, the method comprising:
obtaining from the first server the plurality of indices used for managing files in the first server, wherein the obtained plurality of indices includes a plurality of values corresponding to keys designated by a user;
presenting the plurality of values included in the obtained plurality of indices;
receiving a user operation for searching for an export target file based on the plurality of values presented by the presenting unit, wherein the user operation is an operation for designating a first value corresponding to a first key and a second value corresponding to a second key as conditions for searching for the export target file;
generating a first folder corresponding to the first value in the second server and generate a second folder corresponding to the second value under the first folder; and
obtaining at least a part of the export target file that is searched for based on the user operation from the first server
to store the obtained file in the generated second folder.

* * * * *